(12) United States Patent
Park et al.

(10) Patent No.: US 12,519,136 B2
(45) Date of Patent: Jan. 6, 2026

(54) ELECTROLYTE FOR RECHARGEABLE LITHIUM BATTERY AND RECHARGEABLE LITHIUM BATTERY COMPRISING SAME

(71) Applicant: SAMSUNG SDI CO., LTD., Yongin-si (KR)

(72) Inventors: Injun Park, Yongin-si (KR); Soojin Kim, Yongin-si (KR); Junyong Lee, Yongin-si (KR); Tae Jin Lee, Yongin-si (KR); Hyejeong Jeong, Yongin-si (KR); Olga Tsay, Yongin-si (KR); Hyunbong Choi, Yongin-si (KR); Jungmin Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 630 days.

(21) Appl. No.: 17/995,476

(22) PCT Filed: Mar. 2, 2021

(86) PCT No.: PCT/KR2021/002540
§ 371 (c)(1),
(2) Date: Oct. 4, 2022

(87) PCT Pub. No.: WO2021/210775
PCT Pub. Date: Oct. 21, 2021

(65) Prior Publication Data
US 2023/0178805 A1    Jun. 8, 2023

(30) Foreign Application Priority Data

Apr. 14, 2020  (KR) .................. 10-2020-0045394

(51) Int. Cl.
| | |
|---|---|
| H01M 10/0567 | (2010.01) |
| H01M 4/38 | (2006.01) |
| H01M 4/525 | (2010.01) |
| H01M 10/0525 | (2010.01) |
| H01M 10/0568 | (2010.01) |
| H01M 4/02 | (2006.01) |

(52) U.S. Cl.
CPC ....... *H01M 10/0567* (2013.01); *H01M 4/386* (2013.01); *H01M 4/387* (2013.01); *H01M 4/525* (2013.01); *H01M 10/0525* (2013.01); *H01M 10/0568* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 3,096,371 A | 7/1963 | Olah et al. |
| 2010/0119956 A1 | 5/2010 | Tokuda et al. |
| 2011/0300452 A1 | 12/2011 | Park et al. |
| 2012/0308881 A1 | 12/2012 | Tokuda et al. |
| 2013/0034759 A1 | 2/2013 | Funada et al. |
| 2016/0351963 A1 | 12/2016 | Shatunov et al. |
| 2018/0191031 A1 | 7/2018 | Yu et al. |
| 2020/0313236 A1 | 10/2020 | Morinaka et al. |

FOREIGN PATENT DOCUMENTS

| | | |
|---|---|---|
| CN | 1667864 A | 9/2005 |
| CN | 102754268 A | 10/2012 |
| CN | 102916223 A | 2/2013 |
| CN | 105958120 A | 9/2016 |
| CN | 107394258 A | 11/2017 |
| CN | 109065951 A | 12/2018 |
| CN | 110931870 A | 3/2020 |
| EP | 2378602 A2 | 10/2011 |
| JP | 2011-187440 A | 9/2011 |
| KR | 10-2011-0133835 A | 12/2011 |
| KR | 10-2015-0022654 A | 3/2015 |
| KR | 10-2016-0141667 A | 12/2016 |
| WO | WO 2019-054417 A1 | 3/2019 |

OTHER PUBLICATIONS

Japanese Office Action dated Oct. 16, 2023, issued in corresponding Japanese Patent Application No. 2022-562357 (2 pages).
Touqeer, Saad, et al., "Direct and straightforward transfer of C1 functionalized synthons to phosphorous electrophiles for accessing gem-P-containing methanes," Organic & Biomolecular Chemistry, vol. 19, 2021, pp. 2425-2429.
EPO Extended European Search Report dated Jul. 17, 2024, issued in corresponding European Patent Application No. 21788862.7 (5 pages).
Chinese Office Action for CN Application No. 202180027627.4, dated Apr. 26, 2025, 13 pages.
Wu, et al., "Study of the electrochemical characteristics of sulfonyl isocyanate/sulfone binary electrolytes for use in lithium-ion batteries", Journal of Power Sources, vol. 202, 2012, pp. 322-331.
Xu, "Electrolytes and Interphases in Li-Ion Batteries and Beyond", Chemical Reviews, vol. 114, 2014, pp. 11503-11618.
International Search Report of PCT/KR2021/002540, Jun. 4, 2021, 6 pages.

*Primary Examiner* — Carlos Barcena
(74) *Attorney, Agent, or Firm* — Womble Bond Dickinson (US) LLP

(57) ABSTRACT

The present invention relates to: an electrolyte for a rechargeable lithium battery, the electrolyte including a non-aqueous organic solvent, a lithium salt, and an electrolyte additive for a rechargeable lithium battery, the electrolyte additive including a compound represented by Chemical Formula 1; and a rechargeable lithium battery comprising the electrolyte for a rechargeable lithium battery. Chemical Formula 1 is as defined in the specification.

[Chemical Formula 1]

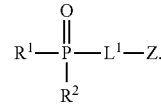

9 Claims, 1 Drawing Sheet

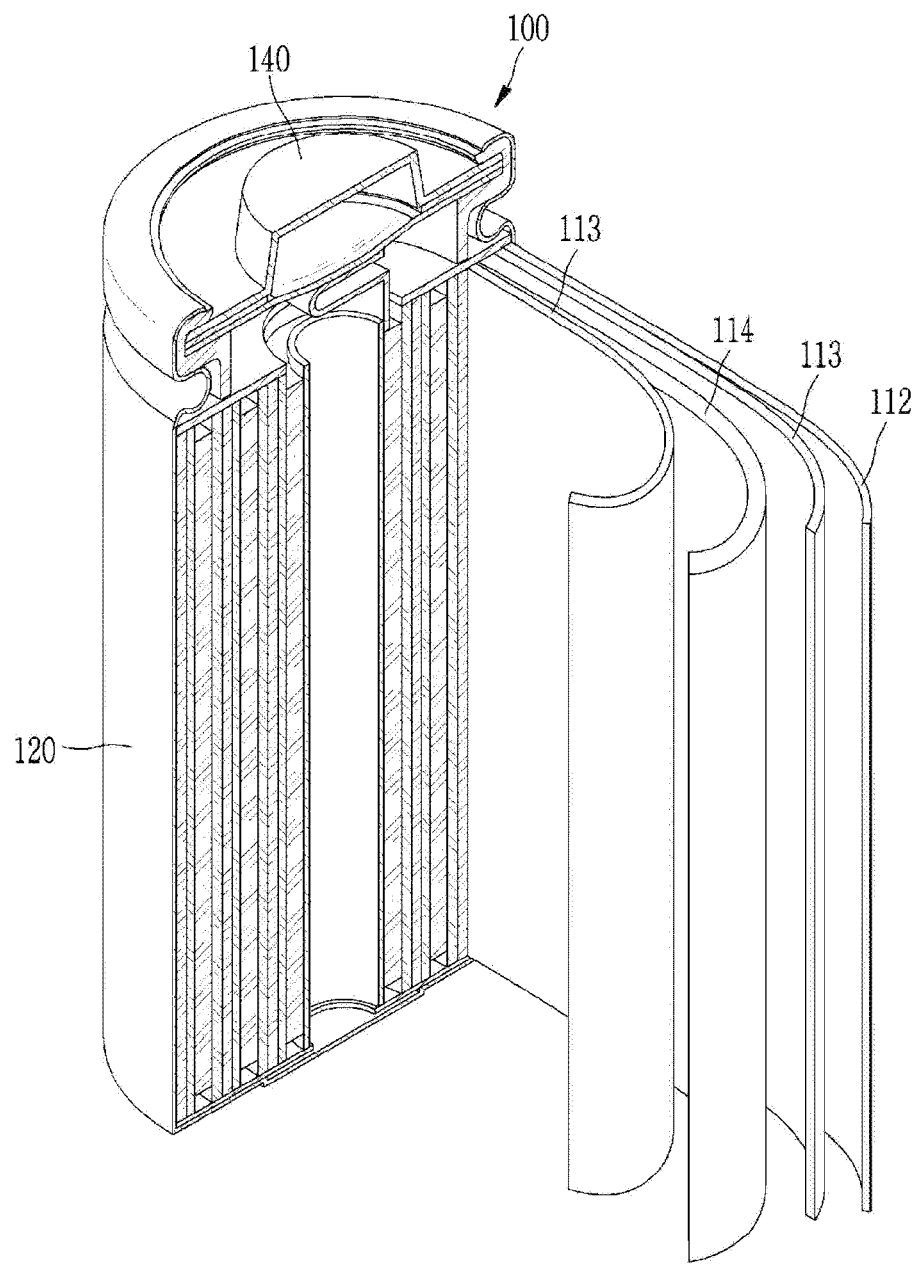

ELECTROLYTE FOR RECHARGEABLE LITHIUM BATTERY AND RECHARGEABLE LITHIUM BATTERY COMPRISING SAME

CROSS-REFERENCE TO RELATED APPLICATIONS

This application is a U.S. National Phase Patent Application of International Application Number PCT/KR2021/002540, filed on Mar. 2, 2021, which claims priority of Korean Patent Application Number 10-2020-0045394, filed on Apr. 14, 2020, the entire content of each of which is incorporated herein by reference.

TECHNICAL FIELD

An electrolyte for a rechargeable lithium battery and a rechargeable lithium battery including the same are disclosed.

BACKGROUND ART

A rechargeable lithium battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a rechargeable lithium battery is manufactured by injecting an electrolyte into a battery cell, which includes a positive electrode including a positive electrode active material capable of intercalating/deintercalating lithium ions and a negative electrode including a negative electrode active material capable of intercalating/deintercalating lithium ions.

Since the rechargeable lithium battery operates at a high driving voltage, an aqueous electrolyte highly reactive with lithium may not be used, but an organic electrolyte is generally used. The organic electrolyte is prepared by dissolving lithium salt in an organic solvent, wherein the organic solvent should be stable at the high voltage and have high ion conductivity and a high dielectric constant but low viscosity.

When a carbonate-based polar non-aqueous solvent and the like is used in the rechargeable lithium battery, an irreversible reaction, in which an excessive amount of charges is used due to a side reaction between negative/positive electrodes and the electrolyte during the initial charge, proceeds. Since the irreversible reaction forms a thick solid electrolyte interface layer (SEI) made of a decomposition product of components of the electrolyte on the surface of the electrodes, initial resistance of the rechargeable lithium battery may increase, and cycle capacity retention may be rapidly lost, resulting in deteriorating cycle-life characteristics. In particular, since the electrolyte decomposition is more accelerated at a high operation temperature and operation voltage, the cycle-life characteristics may be more seriously deteriorated.

$LiPF_6$ that is most commonly used as a lithium salt of an electrolyte has a problem of reacting with an electrolytic solvent to promote depletion of a solvent and generate a large amount of gas. In addition, $LiPF_6$ is decomposed and thus generates the decomposition products such as HF, $PF_5$, and the like, which may deplete the electrolyte in the battery, resulting in deteriorating high temperature performance and weakening safety of the battery.

The decomposition products of the electrolyte are deposited in the form of a film on the surface of the electrodes and thereby, increase internal resistance of the battery and eventually, deteriorate battery performance and shorten a cycle-life. In particular, at a high temperature where the side reaction is accelerated, gas components generated by the side reaction may rapidly increase the battery internal pressure and have a fatal adverse effect on stability of the battery.

In the high voltage region, the electrolyte oxidation is very accelerated and thus known to greatly increase resistance of the electrodes during the long-term charging and discharging process.

Accordingly, an electrolyte applicable under high voltage and high temperature conditions is required. In other words, the electrolyte should secure excellent ion conductivity and stability and particularly, high stability such as no side reaction under the high voltage and high temperature conditions and the like.

DISCLOSURE

Technical Problem

An embodiment provides an electrolyte for a rechargeable lithium battery capable of improving storage and cycle-life characteristics under high voltage/high temperature conditions corresponding to a high-capacity positive electrode by suppressing decomposition of an electrolyte and reducing a side reaction occurring on the surface of the positive electrode under the high voltage condition.

Another embodiment provides a rechargeable lithium battery including the electrolyte for a rechargeable lithium battery and thus exhibiting improved stability and cycle-life characteristics at a high voltage and a high temperature.

Technical Solution

An embodiment of the present invention provides an electrolyte for a rechargeable lithium battery including a non-aqueous organic solvent, a lithium salt, and an additive, wherein the additive includes a compound represented by Chemical Formula 1.

[Chemical Formula 1]

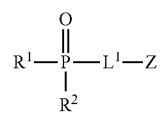

In Chemical Formula 1, $L^1$ is a single bond, a substituted or unsubstituted C1 to C5 alkylene group, a substituted or unsubstituted C1 to C5 cycloalkylene group, or a substituted or unsubstituted C6 to C15 arylene group, Z is an isocyanate group (—NCO), an isothiocyanate group (—NCS), a cyanate group (—OCN), a thiocyanate group (—SCN), a cyano group (—CN), or an isocyano group (—NC), and $R^1$ and $R^2$ are the same or different and are each independently hydrogen, a substituted or unsubstituted C1 to C10 alkyl group, a substituted or unsubstituted C1 to C10 alkenyl group, a substituted or unsubstituted C1 to C10 alkynyl group, a substituted or unsubstituted C3 to C20 cycloalkyl group, or a halide group.

Another embodiment provides a rechargeable lithium battery including a positive electrode including a positive electrode active material, a negative electrode including a negative electrode active material, and the aforementioned electrolyte for the rechargeable lithium battery.

Advantageous Effects

The electrolyte for a rechargeable lithium battery according to an embodiment may be included in a rechargeable lithium battery to form a film capable of protecting a positive electrode active material under high voltage/high temperature conditions to improve high temperature resistance characteristics and cycle-life characteristics of the rechargeable lithium battery including the same.

DESCRIPTION OF THE DRAWINGS

FIG. 1 is a schematic view of a rechargeable lithium battery according to an embodiment of the present invention.

MODE FOR INVENTION

Hereinafter, embodiments of the present invention are described. However, these embodiments are exemplary, the present invention is not limited thereto and the present invention is defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a rechargeable lithium battery according to an embodiment is described.

An electrolyte for a rechargeable lithium battery according to an embodiment may include a non-aqueous organic solvent, a lithium salt, and an additive, wherein the additive includes a compound represented by Chemical Formula 1.

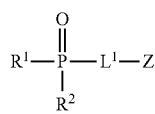

[Chemical Formula 1]

In Chemical Formula 1, $L^1$ is a single bond, a substituted or unsubstituted C1 to C5 alkylene group, a substituted or unsubstituted C1 to C5 cycloalkylene group, or a substituted or unsubstituted C6 to C15 arylene group, Z is an isocyanate group (—NCO), an isothiocyanate group (—NCS), a cyanate group (—OCN), a thiocyanate group (—SCN), a cyano group (—CN), or an isocyano group (—NC), and $R^1$ and $R^2$ are the same or different and are each independently hydrogen, a substituted or unsubstituted C1 to C10 alkyl group, a substituted or unsubstituted C1 to C10 alkenyl group, a substituted or unsubstituted C1 to C10 alkynyl group, a substituted or unsubstituted C3 to C20 cycloalkyl group, or a halide group.

The electrolyte for a rechargeable lithium battery includes the additive including the compound represented by Chemical Formula 1 and thus may improve storage and cycle-life characteristics of a rechargeable lithium battery including the same at a high temperature.

Without being bound to specific theory, the compound represented by Chemical Formula 1 includes a phosphine functional group including a double bond of P (phosphorus) and O (oxygen) in a molecule, and to this phosphine functional group, an electron withdrawing group of an isocyanate group (—NCO), an isothiocyanate group (—NCS), a cyanate group (—OCN), a thiocyanate group (—SCN), a cyano group (—CN), or an isocyano group (—NC) is bound. The electron withdrawing group introduced into the phosphine functional group has a high dipole moment and may be firmly bound with a transition metal or a transition metal oxide exposed onto the surface of the positive electrode active material, for example, a transition metal or a transition metal oxide included in the nickel-based positive electrode active material to form a complex-type protective layer. Accordingly, during the initial charge of the rechargeable lithium battery, the compound represented by Chemical Formula 1 in which the electron withdrawing group is bound to the phosphine functional group may form a stronger and denser inactive film in a state of being absorbed onto the surface of the electrode, and this inactive film is firmly bonded with the surface of the positive electrode active material and may continuously maintain stability despite repeated charges and discharges, improving high-temperature storage characteristics and cycle-life characteristics of a rechargeable lithium battery including the same.

For example, in Chemical Formula 1, L may be a single bond, or a substituted or unsubstituted C1 to C3 alkylene group, Z may be an isocyanate group (—NCO) or an isothiocyanate group (—NCS), and $R^1$ and $R^2$ may be the same or different halide groups.

In an embodiment, in Chemical Formula 1, L may be a single bond, Z may be an isocyanate group (—NCO) or an isothiocyanate group (—NCS), and $R^1$ and $R^2$ may each independently be —F.

For example, the additive may include a compound represented by Chemical Formula 2.

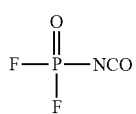

[Chemical Formula 2]

The additive may be included in an amount of 0.05 wt % to 5 wt %, for example, 0.05 wt % to 3 wt %, for example 0.1 wt % to 3 wt %, for example 0.1 wt % to 2 wt % %, or for example, 0.5 wt % to 1.5 wt % based on the total weight of the electrolyte. When the content range of the additive is as described above, an increase in resistance at high temperatures may be prevented to implement a rechargeable lithium battery with improved cycle-life characteristics.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, t-butyl acetate, methylpropionate, ethylpropionate, propylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone, and the like. The alcohol-based solvent may include ethanol, isopropyl alcohol, and the like and the aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used singularly or in a mixture and when the organic solvent is used in a mixture, the mixture ratio may be controlled in accordance with a desirable battery performance.

The carbonate-based solvent is prepared by mixing a cyclic carbonate and a chain carbonate. When the cyclic carbonate and chain carbonate are mixed together in a volume ratio of 1:1 to 1:9, an electrolyte performance may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 3]

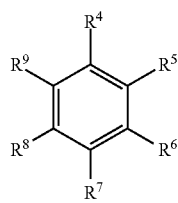

In Chemical Formula 3, $R^4$ to $R^9$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 4 in order to improve cycle-life of a battery.

[Chemical Formula 4]

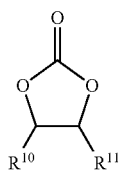

In Chemical Formula 4, $R^{10}$ and $R^{11}$ are the same or different, and are hydrogen, a halogen, a cyano group (CN), a nitro group ($NO_2$), and a fluorinated C1 to C5 alkyl group, provided that at least one of $R^{10}$ and $R^{11}$ is a halogen, a cyano group (CN), a nitro group ($NO_2$), and a fluorinated C1 to C5 alkyl group and $R^{10}$ and $R^{11}$ are not simultaneously hydrogen.

Examples of the ethylene-based carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)$$(C_yF_{2y+1}SO_2)$ (wherein x and y are natural numbers, for example, an integer ranging from 1 to 20), LiCl, LiI, and $LiB(C_2O_4)_2$ (lithium bis(oxalato) borate:LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a rechargeable lithium battery including a positive electrode including a positive electrode active material, a negative electrode including a negative electrode active material, and the aforementioned electrolyte.

The positive electrode may include a current collector and a positive electrode active material layer formed on the current collector and including a positive electrode active material.

The positive electrode active material may include lithiated intercalation compounds that reversibly intercalate and deintercalate lithium ions.

Specifically, the positive electrode active material may include at least one of composite oxides of lithium and a metal selected from cobalt, manganese, nickel, and a combination thereof, and the composite oxides may be a compound represented by any one of the following formulas as a compound capable of reversible intercalation and deintercalation of lithium.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$.

In chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The composite oxide may have a coating layer on the surface, or may be mixed with another composite oxide having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive electrode active material by using these elements in the compound. For example, the method may include any coating method (e.g., spray coating, dipping, etc.), but is not illustrated in more detail since it is well-known to those skilled in the related field.

According to an embodiment, the composite oxide may specifically include a lithium nickel-based transition metal oxide. The lithium nickel-based transition metal oxide may include lithium nickel oxide, lithium nickel cobalt manganese oxide, lithium nickel cobalt aluminum oxide, lithium nickel phosphate, or a combination thereof.

For example, the positive electrode active material may be one or more of a composite oxide of lithium and a metal selected from cobalt, manganese, nickel, aluminum, and a combination thereof, and the most specific example of the positive electrode active material according to an embodiment may be a compound of Chemical Formula 5.

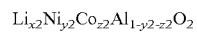   [Chemical Formula 5]

In Chemical Formula 5, 1≤x2≤1.2, 0.6≤y2≤1, and 0≤z2≤0.5.

A rechargeable lithium battery including a lithium nickel-based transition metal oxide as a positive electrode active material and an electrolyte including an additive including the compound represented by Chemical Formula 1 may exhibit excellent room-temperature and high-temperature cycle-life characteristics. In particular, this effect may be significantly improved when the content of the additive including the compound represented by Chemical Formula 1 is included in the above range.

The positive electrode active material may be included in an amount of 90 wt % to 98 wt % based on the total weight of the positive electrode active material layer.

In an embodiment of the present invention, the positive electrode active material layer may include a binder and a conductive material. Herein, the binder and the conductive material may be included in an amount of 1 wt % to 5 wt %, respectively based on the total amount of the positive electrode active material layer.

The binder improves binding properties of positive electrode active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The negative electrode includes a current collector and a negative electrode active material layer formed on the current collector and including a negative electrode active material.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include a carbon-based material and the carbon-based material may be any generally-used carbon-based negative electrode active material in a lithium ion secondary battery. Examples thereof may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material or a Sn-based negative electrode active material, the Si-based negative electrode active material may be silicon, a silicon-carbon composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), the Sn-based negative electrode active material may be Sn, $SnO_2$, a Sn—R alloy (wherein R is an alkali metal, an alkaline-earth metal, a Group 13 element, a Group 14 element, a Group 15 element, a Group 16 element, a transition metal, a rare earth element, and a combination thereof, and not Sn), and at least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The silicon-carbon composite may include a core including crystalline carbon and silicon particles and an amorphous carbon coating layer disposed on the surface of the core. The crystalline carbon may be artificial graphite, natural graphite, or a combination thereof. The amorphous carbon precursor may include a coal-based pitch, a mesophase pitch, a petroleum-based pitch, a coal-based oil, a petroleum-based heavy oil, or a polymer resin such as a phenol resin, a furan resin, or a polyimide resin. In this case, a content of silicon may be 10 wt % to 50 wt % based on the total weight of the silicon-carbon composite. In addition, a content of the crystalline carbon may be 10 wt % to 70 wt % based on the total weight of the silicon-carbon composite, and a content of the amorphous carbon may be 20 wt % to 40 wt % based on the total weight of the silicon-carbon composite. In addition, a thickness of the amorphous carbon coating layer may be 5 nm to 100 nm. An average particle diameter (D50) of the silicon particles may be 10 nm to 20 μm. The average particle diameter (D50) of the silicon particles may be desirably 10 nm to 200 nm. The silicon particles may be present in an oxidized form, where the atomic content ratio of Si:O in the silicon particles indicating a degree of oxidation may be 99:1 to 33:67. The silicon particles may be $SiO_x$ particles, where x range in $SiO_x$ may be greater than 0 and less than 2. In the present specification, unless otherwise defined, an average particle diameter (D50) indicates a particle where a cumulative volume is 50 volume % in a particle distribution.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and used, the mixing ratio may be 1:99 to 10:90 wt %. The carbon-based negative electrode active material may include crystalline carbon or amorphous carbon. The crystalline carbon may be artificial graphite, natural graphite, or a combination thereof. The amorphous carbon precursor may include a coal-based pitch, a mesophase pitch, a petroleum-based pitch, a coal-based oil, a petroleum-based heavy oil, or a polymer resin such as a phenol resin, a furan resin, or a polyimide resin.

A rechargeable lithium battery including an electrolyte including the Si-based negative electrode active material or Sn-based negative electrode active material and including an additive including the compound represented by Chemical Formula 1 may exhibit excellent room-temperature and high-temperature cycle-life characteristics. In particular, this effect may be significantly improved when the content of the additive including the compound represented by Chemical Formula 1 is included in the above range.

The transition metal oxide may be vanadium oxide, lithium vanadium oxide, or lithium titanium oxide.

In the negative electrode active material layer, the negative electrode active material may be included in an amount of 95 wt % to 99 wt % based on the total weight of the negative electrode active material layer.

In an embodiment of the present invention, the negative electrode active material layer includes a binder, and optionally a conductive material. In the negative electrode active material layer, a content of the binder may be 1 wt % to 5 wt % based on the total weight of the negative electrode active material layer. When the negative electrode active material layer includes a conductive material, the negative electrode active material layer includes 90 wt % to 98 wt % of the negative electrode active material, 1 wt % to 5 wt % of the binder, and 1 wt % to 5 wt % of the conductive material.

The binder improves binding properties of negative electrode active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber (SBR), an acrylated styrene-butadiene rubber, an acrylonitrile-butadiene rubber (ABR), an acrylic rubber, a butyl rubber, a fluorine rubber, and a combination thereof. The polymer resin binder may be selected from polyethyleneoxide, polyvinylpyrrolidone, polyepichlorohydrine, polyphosphazene, polyacrylonitrile, an ethylene propylene diene copolymer, polyvinylpyridine, chlorosulfonatedpolyethylene, latex, a polyester resin, an acrylic resin, a phenolic resin, an epoxy resin, polyvinyl alcohol, and a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative electrode active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

A separator may be further included between the negative electrode and the positive electrode, depending on a type of the rechargeable lithium battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator. Referring to FIG. 1, a rechargeable lithium battery 100 according to an embodiment includes a battery cell including a negative electrode 112, a positive electrode 114 facing the negative electrode 112, a separator 113 interposed between the negative electrode 112 and the positive electrode 114, and an electrolyte 113 (not shown) for a rechargeable lithium battery impregnating the negative electrode 112, the positive electrode 114, and the separator 113, a battery case 120 housing the battery cell, and a sealing member 140 sealing the battery case 120.

DETAILED DESCRIPTION OF THE EMBODIMENTS

Hereinafter, examples of the present invention and comparative examples are described. These examples, however, are not in any sense to be interpreted as limiting the scope of the invention.
Manufacture of Rechargeable Lithium Battery Cell Example 1

$LiNi_{0.88}Co_{0.105}Al_{0.015}O_2$ as a positive electrode active material, polyvinylidene fluoride as a binder, and carbon black as a conductive material were mixed in a weight ratio of 98:1:1 and then, dispersed in N-methyl pyrrolidone, preparing positive electrode active material slurry.

The positive electrode active material slurry was coated on a 20 μm-thick Al foil, dried at 100° C., and pressed to manufacture a positive electrode.

Negative electrode active material slurry was prepared by mixing a mixture of a silicon-carbon composite as a negative electrode active material and graphite (in a weight ratio of 5:95), a styrene-butadiene rubber as a binder, and carboxylmethyl cellulose in a weight ratio of 98:1:1 and dispersing the obtained mixture in distilled water.

The negative electrode active material slurry was coated on a 10 μm-thick Cu foil, dried at 100° C., and pressed to manufacture a negative electrode.

The positive and negative electrodes, a 25 μm-thick polyethylene separator, and an electrolyte solution were used to manufacture a rechargeable lithium battery cell.

The electrolyte solution has a following composition.
(Composition of Electrolyte Solution)
Salt: 1.5 M $LiPF_6$
Solvent: ethylene carbonate:ethylmethyl carbonate:dimethyl carbonate (EC:EMC:DMC=a volume ratio of 2:1:7)
Additive: 0.5 wt % of the compound represented by Chemical Formula 2

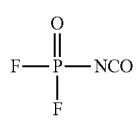

[Chemical Formula 2]

(Herein, in the composition of the electrolyte solution, "wt %" is based on the total amount of an electrolyte (a lithium salt+a non-aqueous organic solvent+an additive))

Example 2

A rechargeable lithium battery cell was manufactured in the same method as Example 1 except that the compound represented by Chemical Formula 2 was used in an amount of 1.0 wt %.

Example 3

A rechargeable lithium battery cell was manufactured in the same method as Example 1 except that the compound represented by Chemical Formula 2 was used in an amount of 1.5 wt %.

Example 4

A rechargeable lithium battery cell was manufactured in the same method as Example 1 except that $LiCoO_2$ was used instead of $LiNi_{0.88}Co_{0.105}Al_{0.015}O_2$ as the positive electrode active material.

Comparative Example 1

A rechargeable lithium battery cell was manufactured in the same method as Example 1 except that the additive was not used.

Comparative Example 2

A rechargeable lithium battery cell was manufactured in the same method as Example 1 except that $LiCoO_2$ was used instead of $LiNi_{0.88}Co_{0.105}Al_{0.015}O_2$ as the positive electrode active material, and the additive was not used.
Evaluation 1: Initial Discharge Capacity
Initial discharge capacity of the cells was measured in the following method. The rechargeable lithium battery cells according to Examples 1, 2, and 4 and Comparative Examples 1 to 2 were respectively charged (pre-charged) at a current of 1 A for 3 minutes at room temperature (25° C.) and then, aged for 24 hours for electrolyte solution impregnation. Subsequently, the cells were charged to 4.2 V under a constant current condition and discharged to 2.5 V and then, charged again to SOC (state of charge) of 50% and aged at 45° C. for 3 days, which proceeded for a formation process. Subsequently, the cells were respectively once charged and discharged under a charge condition of constant current-constant voltage of 1.6 C and 4.2 V and cut-off at 0.025 C and under a discharge condition of a constant current of 2.5 C and cut-off at 2.5 V at room temperature (25° C.) and then, measured with respect to discharge capacity, and the results are shown in Tables 1 and 2.

TABLE 1

|  | Discharge Capacity (mAh) |
| --- | --- |
| Example 1 | 2,462 |
| Example 2 | 2,458 |
| Comparative Example 1 | 2,454 |

TABLE 2

|  | Discharge Capacity (mAh) |
| --- | --- |
| Example 4 | 2,218 |
| Comparative Example 2 | 2,214 |

Referring to Tables 1 and 2, the rechargeable lithium battery cells of Examples 1, 2, and 4 included the additive within the range of the present invention and exhibited improved initial discharge capacity, compared with the cells of the Comparative Examples 1 and 2.

Evaluation 2: Initial Resistance (DC-IR)

DC-IR (Direct Current Internal Resistance) was measured in the following method. Each rechargeable lithium battery cell according to Examples 1 to 2 and Comparative Example 1 was charged at 4 A and 4.2 V at room temperature (25° C.) and then, cut off at 100 mA and paused for 30 minutes. Subsequently, the cells were respectively discharged at 10 A for 10 seconds, at 1 A for 10 seconds, and at 10 A for 4 seconds and then, measured with respect to currents and voltages at 18 seconds and at 23 seconds, and then, initial resistances (a difference between resistance at 18 seconds and resistance at 23 seconds) of the cells were calculated according to $\Delta R = \Delta V / \Delta I$, which are shown in Table 3.

TABLE 3

| | Initial DC-IR (mOhm) |
|---|---|
| Example 1 | 21.11 |
| Example 2 | 21.38 |
| Comparative Example 1 | 21.58 |

Referring to Table 3, the rechargeable lithium battery cells of Examples 1 to 2 included the additive within the range of the present invention and exhibited reduced initial resistance, compared with the rechargeable lithium battery cell of Comparative Example 1.

Evaluation 3: High-Temperature Storage Characteristics

The rechargeable lithium battery cells according to Examples 1 to 3 and Comparative Example 1 were left in a state of charge (SOC) of 100% at 60° C. for 30 days and then, evaluated with respect to an increase rate of internal resistance when left at a high temperature (60° C.), and the results are shown in Table 4.

Initial DC-IR of the cells of Examples 1 to 3 and Comparative Example 1 was measured in the same method as in Evaluation 2. After measuring the initial DC-IR, the rechargeable lithium battery cells according to Examples 1 to 3 and Comparative Example 1 were charged under a charge condition of 0.2 C and 4.3 V and left at 60° C. for 30 days and then, measured with respect to DC-IR (direct current internal resistance) to calculate a resistance increase rate before and after beling left according to Equation 1, and the results are shown in Table 4.

Resistance increase rate (%)=[(DC-IR after being left for 30 days−initial DC-IR)/initial DC-IR]× 100          [Equation 1]

TABLE 4

| | Initial DC-IR (mOhm) | DC-IR after being left for 30 days (mOhm) | Δ DC-IR (%) |
|---|---|---|---|
| Example 1 | 21.11 | 27.95 | 32.4 |
| Example 2 | 21.38 | 28.10 | 31.4 |
| Example 3 | 22.41 | 29.48 | 31.5 |
| Comparative Example 1 | 21.58 | 31.09 | 44.1 |

Referring to Table 4, the rechargeable lithium battery cells according to Examples 1 to 3 exhibited a reduced resistance increase rate before and after being left, compared with the cell according to Comparative Example 1. Accordingly, the rechargeable lithium battery cells according to Examples 1 to 3 included the additive within the range of the present invention and exhibited improved high temperature stability, compared with the cell of Comparative Example 1.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: rechargeable lithium battery
112: negative electrode
113: separator
114: positive electrode
120: battery case
140: sealing member

The invention claimed is:

1. An electrolyte for a rechargeable lithium battery, comprising
a non-aqueous organic solvent, a lithium salt, and an additive,
wherein the additive includes a compound represented by Chemical Formula 1:

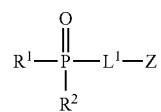

[Chemical Formula 1]

wherein, in Chemical Formula 1,
$L^1$ is a single bond, a substituted or unsubstituted C1 to C5 alkylene group, a substituted or unsubstituted C1 to C5 cycloalkylene group, or a substituted or unsubstituted C6 to C15 arylene group,
Z is an isocyanate group (—NCO), an isothiocyanate group (—NCS), a cyanate group (—OCN), a thiocyanate group (—SCN), or an isocyano group (—NC), and
$R^1$ and $R^2$ are the same or different and are each independently hydrogen, a substituted or unsubstituted $C_1$ to C10 alkyl group, a substituted or unsubstituted $C_1$ to C10 alkenyl group, a substituted or unsubstituted $C_1$ to C10 alkynyl group, a substituted or unsubstituted $C_3$ to C20 cycloalkyl group, or a halide group.

2. The electrolyte for a rechargeable lithium battery of claim 1, wherein
L is a single bond, or a substituted or unsubstituted $C_1$ to $C_3$ alkylene group,
Z is an isocyanate group (—NCO) or an isothiocyanate group (—NCS), and
$R^1$ and $R^2$ are the same or different halide group.

3. The electrolyte for a rechargeable lithium battery of claim 1, wherein
L is a single bond,
Z is an isocyanate group (—NCO) or an isothiocyanate group (—NCS), and
$R^1$ and $R^2$ are each independently —F.

4. The electrolyte for a rechargeable lithium battery of claim 1, wherein
the additive includes a compound represented by Chemical Formula 2:

[Chemical Formula 2]

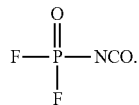

5. The electrolyte for a rechargeable lithium battery of claim 1, wherein
the additive is included in an amount of 0.05 wt % to 5 wt % based on the total amount of the electrolyte.

6. The electrolyte for a rechargeable lithium battery of claim 1, wherein
the additive is included in an amount of 0.1 wt % to 3 wt % based on the total amount of the electrolyte.

7. A rechargeable lithium battery, comprising
a positive electrode including a positive electrode active material;
a negative electrode including a negative electrode active material; and
the electrolyte for the rechargeable lithium battery of claim 1.

8. The rechargeable lithium battery of claim 7, wherein
the positive electrode active material includes a lithium nickel-based transition metal oxide selected from lithium nickel oxide, lithium nickel cobalt manganese oxide, lithium nickel cobalt aluminum oxide, lithium nickel phosphate, or a combination thereof.

9. The rechargeable lithium battery of claim 7, wherein
the negative electrode active material includes a Si-based negative electrode active material or a Sn-based negative electrode active material.

\* \* \* \* \*